Sept. 20, 1960 P. P. KUBIK 2,953,405
BOLT RETRACTOR
Filed June 11, 1956 2 Sheets-Sheet 2

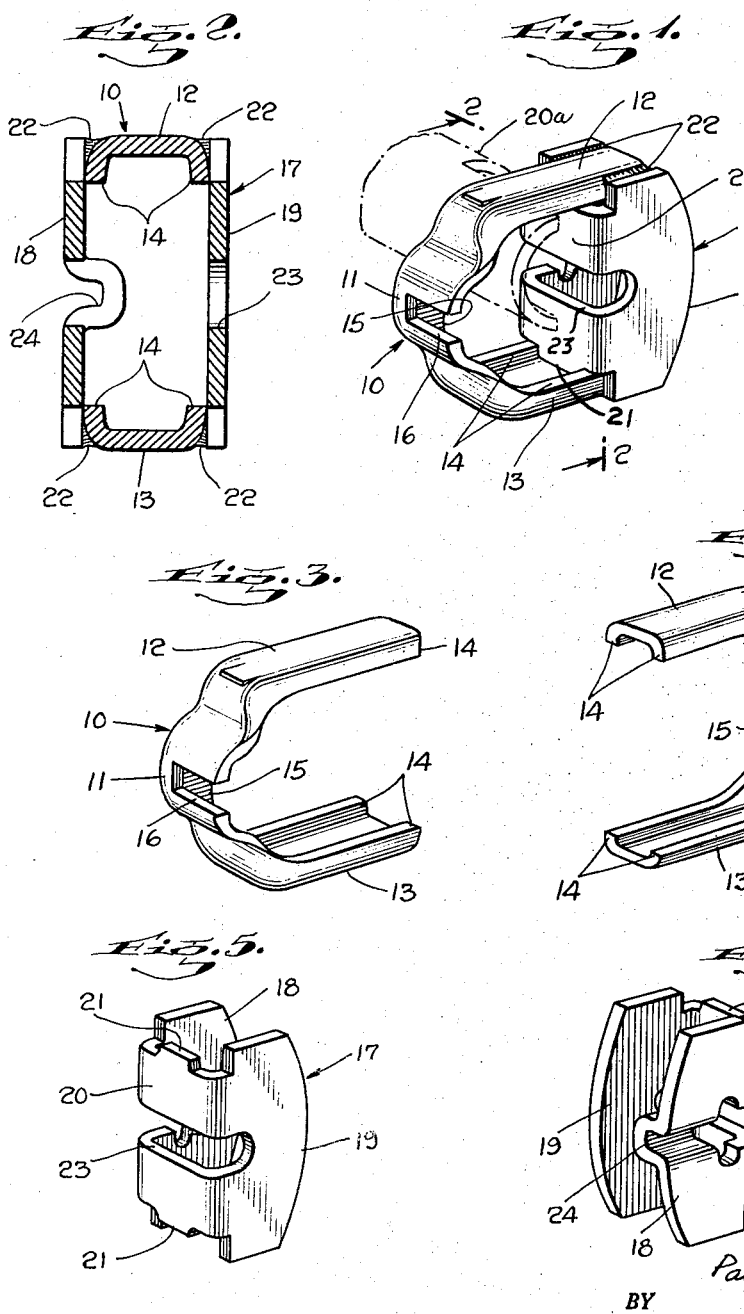

INVENTOR
Paul P. Kubik
BY
A.H. Golden
ATTORNEY

United States Patent Office 2,953,405
Patented Sept. 20, 1960

2,953,405
BOLT RETRACTOR

Paul P. Kubik, Philadelphia, Pa., assignor to The Yale & Towne Manufacturing Company, Stamford, Conn., a corporation of Connecticut Filed June 11, 1956, Ser. No. 590,696

4 Claims. (Cl. 292—169)

My invention relates to a bolt retractor of the type utilized in a cylindrical lock. In such locks the retractor coacts with a rotating spindle sleeve that moves the retractor to retract a latchbolt.

Those skilled in the art will appreciate that bolt retractors of the particular type are formed with a contact surface against which the spindle sleeve impinges, and a front end that coacts with the latchbolt. The spindle sleeve is arranged in a transverse axis in front of the contact surface, so that the retractor must have a relatively large opening to permit the necessary retractor movement. Also, the contact surface is relatively large, since parts of the spindle sleeve will move for a considerable distance on that surface as the sleeve rotates. These conditions make it extremely difficult to construct the retractor with a strong, rigid front end. The problem is made even more difficult by the fact that the front end is itself formed with a transverse slot to interlock with the latchbolt.

Numerous constructions have already been developed for bolt retractors of this type. Sheet metal is generally utilized as the material for the retractors, since it offers advantages from a manufacturing and cost standpoint. However, those earlier retractors embody complicated and difficult constructions, and still do not have that strength that is desirable. Thus, in many retractors the front end has two spaced sheet metal arms that define between them a slot for the latchbolt so that the front end is not actually rigid. My construction represents a very considerable advance over the prior art retractors, since it enables me to utilize sheet metal to form an extremely rigid integral front end, as well as a long contact surface for the spindle.

As one feature of my invention, I utilize as the front piece of the retractor a single piece of sheet metal having a pair of integral arms and a slot formed for interlocking with the latchbolt. Preferably, the metal is in the form of a U, with the slot in the bend of the U. At least one end of the slot is so formed that it is reinforced by an integral part of said single piece of sheet metal. As a more particular part of this feature of my invention I prefer to form the arms as channels, with a flange that is in effect a continuous part of one side of each channel. I contemplate the use of such a flange at each side of the channels, but I have found that merely one flange will enable me to construct my novel retractor with an exceedingly rigid and satisfactory front end.

As a further feature of my invention, I utilize on my retractor a rear piece having side portions that are assembled in reinforcing relation to opposed sides of both arms on the front piece. Extending integrally between the side portions is a relatively long wall that contributes the contact surface for the spindle sleeve. In a preferred form of my construction, I form this contact wall with lugs whereby the wall interlocks with the opposed channel arms of the front piece.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a perspective view showing a preferred form of my extremely novel bolt retractor.

Fig. 2 is a cross-section on line 2—2 of Fig. 1.

Figs. 3 and 4 show opposed sides of the front piece.

Figs. 5 and 6 show the rear piece.

Figure 7:
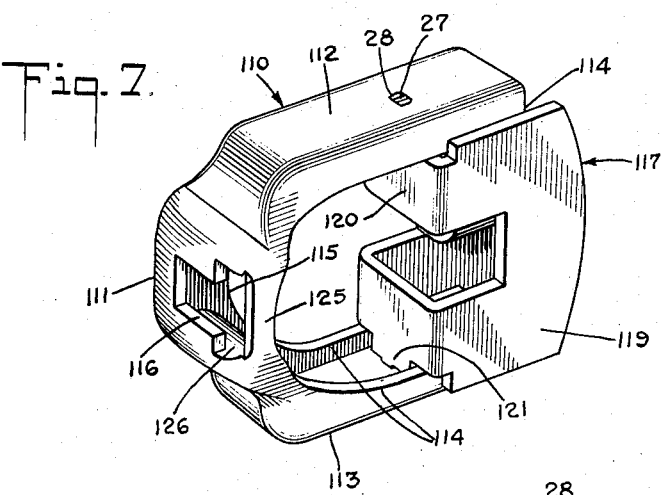
Fig. 7 shows a further construction that embodies my invention.

My invention will perhaps be best understood if I describe first the retractor front piece that I show in Figs. 3 and 4. I form this front piece 10 as an integral sheet metal part having a forward end portion 11 and a pair of opposed arms 12, 13 that extend rearwardly from the upper and lower parts of the end portion 11. The arms 12, 13 are channel shaped in cross-section, as will be readily understood from the drawings, whereby each arm has opposed side flanges 14. The front piece 10 is readily formed through a drawing operation, and during that operation I form a flange 15 that extends along one side of the end portion 11, and that is integral with one side 14 on each of the arms 12, 13, thus forming in effect a continuation of those arms. On the end portion 11 of the front piece I form a transverse slot 16 having one closed end extending toward the flange 15. The opposed end of the slot 16 is open, as is well shown in Figs. 1 and 3, and through this open end a latchbolt can be assembled in interlocking relation to the retractor, as will be understood by those skilled in the art. It is very important to note that, in the construction I have thus far described, the flange 15 extends past the slot 16 while integral with one side 14 on each channel arm. In effect, therefore, flange 15 extends continuously between the arms 12, 13 and along those arms. Flange 15 is integral not only with the arms 12, 13, but also with the front end 11 that has slot 16, thus enabling me to achieve great strength in the front end of the retractor.

In the form of retractor that I show in Figs. 1 to 6, I utilize with the front piece 10 a novel sheet metal rear piece 17. This rear piece 17, shown in detail in Figs. 5 and 6, has opposed side portions 18, 19 that are adapted to lie in reinforcing relation to opposed sides of the channel arms 12, 13, as shown in Fig. 2. Extending integrally between the side portions 18, 19 is a wall 20 that fits intermediate the arms 12, 13 on the front piece. It is important to realize that the wall 20 will contribute a rather extensive contact surface for a spindle sleeve 20a, shown in dotted lines in Fig. 1. I shall call attention also to the fact that the side portions 18, 19 contribute flat outer surfaces that are well adapted to slide on a retractor guide in the cylindrical lock. Also, the upper and lower ends of those portions 18, 19 are so formed, as best seen in Fig. 2, that they do not extend above and below the channel arms 12, 13 whereby the surfaces of those arms are well adapted to slide on the retractor guide.

I further form the sheet metal of the rear piece 17, Figs. 5 and 6, with a lug 21 on each upper and lower end of the wall 20. With the rear piece 17 fitted in position relatively to the front piece 10, as in Fig. 1, the lugs 21 are positioned in the channels of the arms 12, 13. To assemble the rear piece 17 in position, I prefer to weld or braze the side portions 18, 19 to the opposed sides of arms 12, 13, as shown at 22 in Figs. 1 and 2. The front and rear pieces 10 and 17 are then in integral relation to one another, with those pieces further interlocked through the lugs 21 on wall 20. Through this construction, I not only assemble the spindle contact wall 20 in rigid relation to the front piece 10, but I contribute still further to the strength of the front end of the retractor. Thus, the rear piece 17 is interlocked and welded to each of the channel arms 13, 14, and will act through those arms to support rigidly the forward end portion 11 of the retractor. Of course, the end portion 11 is itself extremely rigid, as I have already explained. These things enable me to contribute a retractor that is very much more sturdy than the bolt retractors that have been developed heretofore for locks of the particular class. This I can do despite the fact that I form the wall 20 to offer a relatively large bearing surface, so that a spindle sleeve 20a can contact the retractor over a large area as the sleeve rotates to move the retractor.

In the particular construction that I show in Figs. 1 to 6, the rear piece 17 is formed with a transverse slot 23 and also a grooved part 24 that are adapted to accept a locking piece. Also, the rear piece 17 when assembled is adapted to form a pocket for retractor springs. However, those details are quite similar to those found in the prior art, and are not important to an understanding of the invention that forms the subject of this application.

Figure 8:
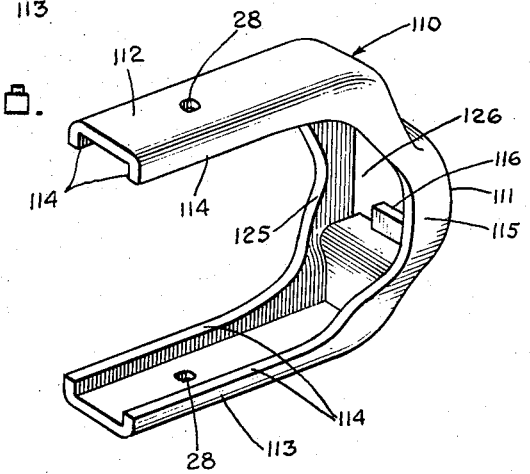
Figs. 8 and 9 show details of the front piece and the rear piece that are shown in Fig. 7.
Figure 9:
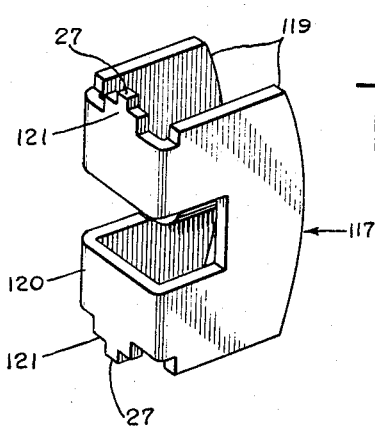

I have found that my invention is exceedingly satisfactory when embodied in the construction that I have described, but I contemplate also a construction having further features, shown in Figs. 7 to 9. In that construction, I utilize a sheet metal front piece 110 having a slotted end portion 111 and channel arms 112, 113 extending from the end portion 111, so that front piece 110 is somewhat like the front piece 10 already described. However, I form the sheet metal of front piece 110 with integral flanges 115, 125 on both opposed sides of the end portion 111. Each flange 115, 125 extends integrally between the channel arms 112, 113, and extends further as one of the flanges 114 on each arm. Thus, the front piece 110 has on each side a continuous flange extending along both arms 112, 113 and past the slot 116. Between the flange 125 and the slot 116, I form an opening 126 for the assembly of a latchbolt in coacting relation to the slot 116. Since in the retractor shown in Figs. 7 to 9 I utilize a continuous flange at each side of the retractor, I am able to make that retractor even stronger than that shown in Figs. 1 to 6.

I show in Figs. 7 and 9 a rear piece 117 that has the essential features of the rear piece shown in Figs. 1 to 6. Thus, the rear piece 117 has side portions 119 that lie in reinforcing relation to opposed sides of the channel arms 112, 113, and a retractor wall 120 that is integral with the side portions and positioned intermediate the arms 112, 113. On opposed ends of the wall 120 I form lugs 121, best seen in Fig. 9, that interlock with the channel arms. In the construction that I show in Figs. 7 to 9, I form the lugs with tabs 27, Fig. 9, that are assembled in openings 28 in the channel arms 112, 113, with the tabs 27 staked in those openings whereby to assembly the rear piece 117 integrally to the front piece 110. Of course, it is conceivable that other tab arrangements may be used for assembling the retractor, and it is important to realize simply that the tabs assemble the rear piece with its side portions in reinforcing relation to the channel arms 112, 113, and with the lugs 121 interlocked relatively to those arms.

I believe that the construction and very considerable merits of my invention will now be understood. Through my invention, I am able to construct a bolt retractor that has a long contact surface for a rotating spindle sleeve, yet I obtain a front end that is exceedingly strong, despite the fact that that end is slotted to interlock with a latchbolt. I believe that those skilled in the art will fully appreciate the very substantial contribution that I have made by my invention.

I now claim:

1. A construction for a bolt retractor of the class described, comprising a front piece and a rear piece that are assembled to form the retractor, said front piece being integrally formed from a single piece of sheet metal to U-shape so as to have a central portion and two arms extending from said central portion rearwardly in spaced relation to one another, a transverse slot extending from one side of the front piece inwardly in said central portion for coacting with a latchbolt, a flange formed on the other side of said U-shaped front piece to extend integrally past said slot on the central portion and along both arms of the front piece, said flange extending to rearward portions of the arms and imparting rigidity to the arms and central portion of the U-shaped front piece, said rear piece including a transverse wall that extends between the arms of the front piece and provides a contact surface for coaction with a retracting member that moves the retractor, opposed angular side portions on said transverse wall, and means securing said rear piece to the arms of the U-shaped front piece with said angular side portions extending along and in contact with the rearward portions and flange on said arms, whereby to form with the front piece a rigid integral retractor.

2. A construction for a bolt retractor of the class described, comprising a front piece and a rear piece that are assembled to form the retractor, said front piece being integrally formed from a single piece of sheet metal to U-shape so as to have a central portion and two arms extending from said central portion rearwardly in spaced relation to one another, each arm being formed with a channel section whereby to have a flange portion on each side thereof, a transverse slot extending inwardly from one side of said central portion of the U-shaped front piece for coacting with a latchbolt, a flange formed on the other side of said central portion and merging with the flange portion on the corresponding side of each channel arm, so that the U-shaped front piece has a flange extending integrally on both arms and past the transverse slot in the central portion whereby to impart rigidity to said front piece, said rear piece including a transverse wall that extends between the channel arms on the front piece and provides a contact surface for coaction with a retracting member that moves the retractor, opposed angular side portions on said transverse wall, and means securing said rear piece to the channel arms of said U-shaped front piece with the angular side portions against the flange portions on the channel arms, whereby to form with the front piece a rigid integral retractor.

3. A construction for a bolt retractor of the class described, comprising a front piece and a rear piece that are assembled to form the retractor, said front piece being integrally formed from a single piece of sheet metal to U-shape so as to have a central portion and two arms extending from said central portion rearwardly in spaced relation to one another, a transverse slot extending from one side of the front piece inwardly in said central portion for coacting with a latchbolt, a flange formed on the other side of said U-shaped front piece to extend integrally past said slot on the central portion and along both arms of the front piece, said flange extending to rearward portions of the arms and imparting rigidity to the arms and central portion of the U-shaped front piece, said rear piece including a transverse wall extending between the arms of the front piece to provide a contact surface for coaction with a retracting member that moves the retractor, and portions extending from said transverse wall and welded to the rearward portions and flange on both arms of the front piece whereby to form a rigid integral retractor.

4. A construction for a bolt retractor of the class described, comprising a front piece and a rear piece that are assembled to form the retractor, said front piece being integrally formed from a single piece of sheet metal to U-shape so as to have a central portion and two arms extending from said central portion rearwardly in spaced relation to one another, both arms and the central portion being formed with a channel section, so that the front piece has at each side an integral continuous flange imparting rigidity to said arms and central portion, a transverse slot extending inwardly adjacent to one flange in said central portion of the U-shaped front piece for coacting with a latchbolt, said rear piece including a transverse wall that extends between the arms on the front piece and provides a contact surface for coaction with a retracting member that moves the retractor, and means securing said rear piece to rearward portions of the arms whereby to form with the front piece a rigid integral retractor.

References Cited in the file of this patent
UNITED STATES PATENTS

| | | |
|---|---|---|
| 1,691,528 | Schlage | Nov. 13, 1928 |
| 1,829,815 | Schlage | Nov. 3, 1931 |
| 2,038,907 | Schlage | Apr. 28, 1936 |
| 2,293,856 | Schlage | Aug. 25, 1942 |
| 2,472,730 | Smith | June 7, 1949 |
| 2,547,256 | Cerf | Apr. 3, 1951 |
| 2,611,635 | Cerf | Sept. 23, 1952 |
| 2,800,351 | Schmid | July 23, 1957 |